Patented July 29, 1952

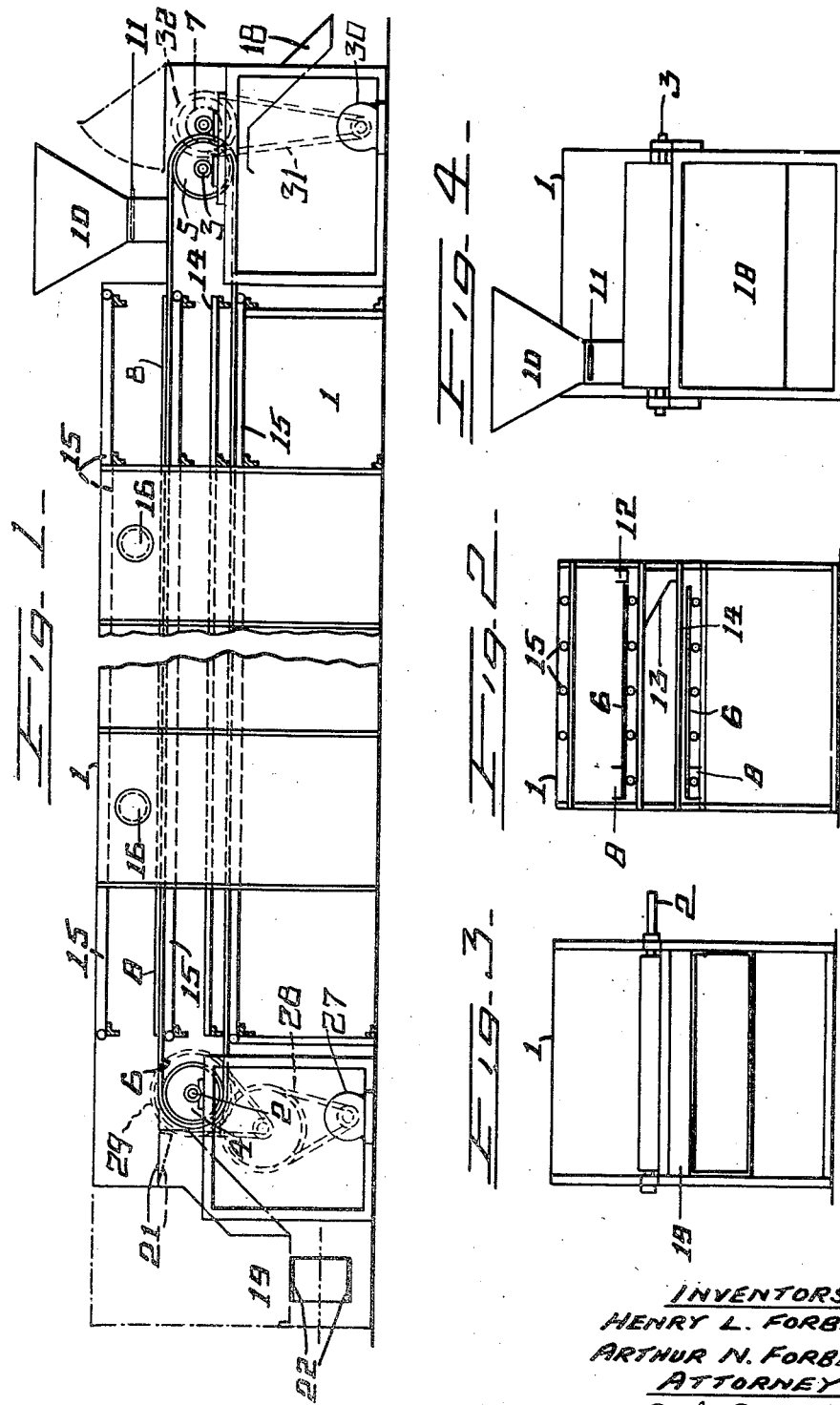

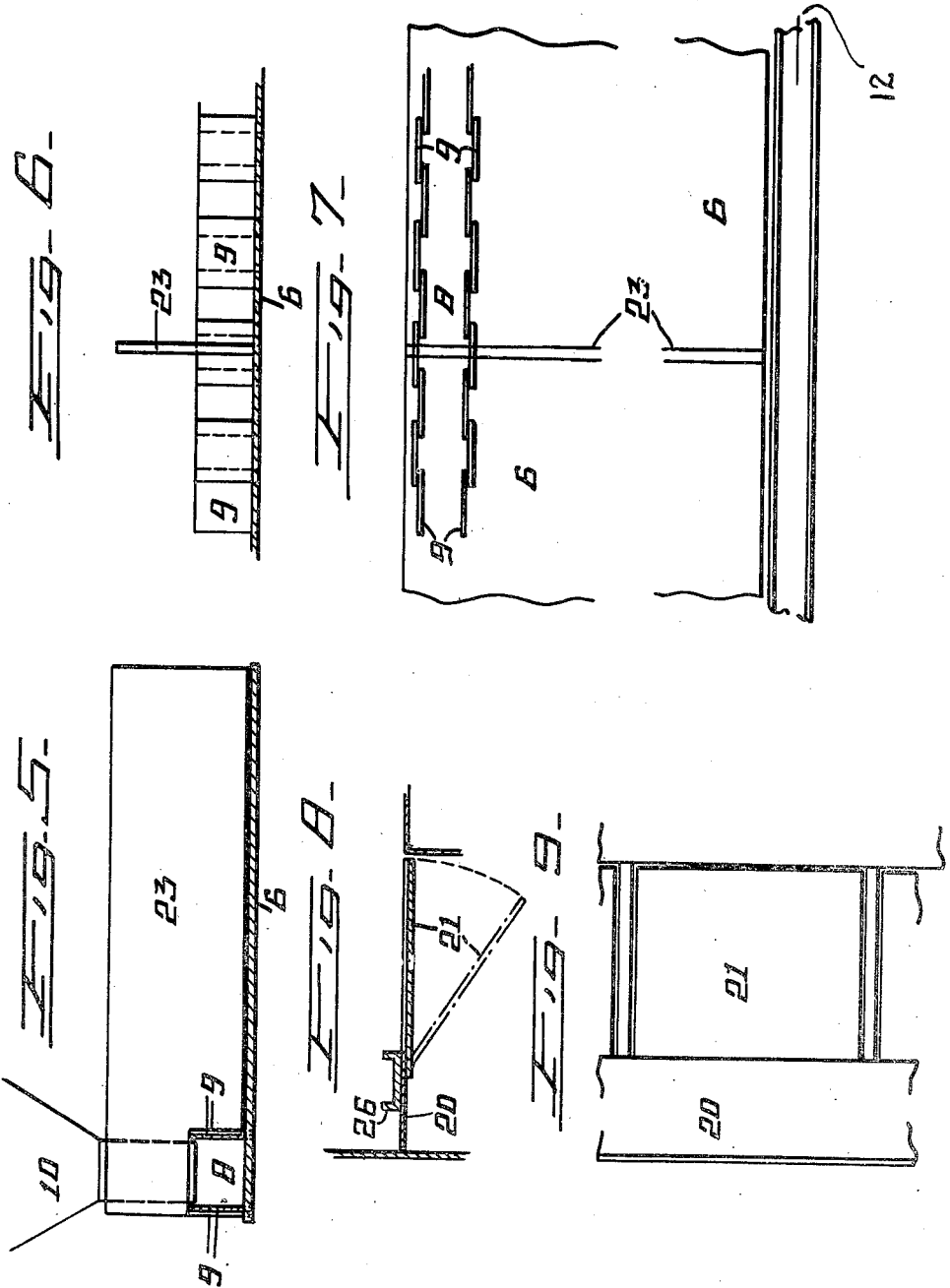

2,604,874

UNITED STATES PATENT OFFICE 2,604,874

APPARATUS FOR THE PRELIMINARY REARING OF LIVESTOCK

Henry Lancelot Forbes and Arthur Norman Forbes, Clutton, England

Application December 8, 1948, Serial No. 64,196
In Great Britain February 6, 1948

9 Claims. (Cl. 119—15)

The invention has for its object a new or improved process and apparatus whereby very young livestock such as ducklings, chickens, turkeys, pigs or the like may be preliminarily reared to a condition suitable for subsequent fattening. The process and apparatus are particularly suitable for rearing day-old ducklings and chickens to a fourteen days old maturity, but as mentioned, are also suitable for the rearing of other kinds of livestock.

According to the invention the process of preliminarily rearing livestock is achieved by the use of apparatus wherein an elongated tunnel or chamber has located therein an endless conveyor belt or belts upon which are directly housed or placed the livestock, means being also provided for containing food and drinking water and for driving said belt and for heating the interior of the chamber. Means are also provided for clearing the conveyor belt or belts of droppings and foreign matter; for illuminating and inspecting or observing the interior of the chamber; for supplying food to the belt or belts and for generally making the apparatus efficient and foolproof.

In order that the invention may be clearly understood and readily carried into effect, the process and apparatus will now be described with reference to and by the aid of the accompanying drawings, in which:

Fig. 1 is a side view, partly in section, of a fragmentary portion of the new or improved apparatus for rearing livestock according to the invention.

Fig. 2 is a transverse end view of the inlet end of Fig. 1 with the food hopper, chute and drive means for the conveyor belt omitted.

Fig. 3 is an end elevation of the end of the apparatus viewed from the left of Fig. 1, and Fig. 4 is a similar view of the apparatus viewed from the right.

Fig. 5 is an enlarged detail end view of a portion of the conveyor belt of the apparatus showing a food hopper and a clearer board.

Fig. 6 is a side view of a median fragment of the belt and clearer board illustrated in Fig. 5, and Fig. 7 is a plan of Fig. 6.

Figs. 8 and 9 are sectional side view and plan respectively of a fragment of the apparatus shown in Fig. 1, drawn to a larger scale.

Similar numerals refer to similar parts throughout the several views.

A tunnel or elongated chamber 1 is provided constructed in any suitable or well known manner from any appropriate materials such as angle irons and sheet metal or fibreboard panels. Arranged within the chamber 1 is a pair of transverse shafts 2, 3 carrying rollers or drums 4, 5, and passing partially around said drums is an endless conveyor band or belt 6 constructed of any suitable flexible material such as woven galvanised wire of fine mesh. Either or both of the aforesaid drums is or are driven by a suitable prime mover, such as an electric motor 27, through the intermediary of any well known type of reduction gear such as the chain and sprocket gear 28 to the sprocket wheel 29 on the shaft 2, in order that the conveyor belt 6 may be continuously driven at a predetermined slow speed which may be varied or regulated according to requirements. A rotary wire brush 7 is fitted and may also be driven from the prime mover but preferably from a separate electric motor 30 driving by means of a sprocket chain 31 the sprocket wheel 32 on the shaft of the brush 7.

A food receptacle 8 is provided in proximity to one side of the belt 6 in the form of a trough, preferably integral with the belt, and may consist of a multiplicity of vertical metal plates or blades 9 arranged to overlap each other as clearly illustrated at Figs. 5–7 of the drawings, so that said trough may be flexible and capable of travelling around the rollers or drums 4, 5. A food hopper 10 is located in such manner as to provide a flow of food to the receptacle 8, the amount of food being capable of variation or regulation by means of a sliding shutter 11 or any other suitable means.

Disposed near the side of the belt remote from the food receptacle 8 is an elongated stationary water trough 12 shown in Fig. 2 but omitted from Fig. 1 for the sake of clearness in the drawing, which trough is secured to the framework of the apparatus, and said trough is preferably provided with a drip tap or cock and a water outlet so arranged that a continuous supply of fresh water is always available for the stock being reared. Beneath the water trough is a drip tray 13 (see Fig. 2) and a waste tray 14.

Heating elements 15 are disposed in the chamber 1 above and below the top stretch of the belt 6 and beneath the bottom stretch of the latter, the elements taking the form of steam pipes, but water pipes, hot air pipes, electrically heated elements or any other suitable or well known heating means may be used, if desired. Observation windows 16 are preferably arranged within the side panels.

At the inlet end of the apparatus is a chute 18 and at the opposite or packing end another chute 19. The mouth of the latter chute is provided with a framework 20 with which are associated a number of hinged flap doors 21, either of flexible rubber or spring-biassed construction, said flaps normally remaining closed in a horizontal position, but which are adapted to be depressed by the weight of a fowl or animal thereon so that said flaps serve as trap doors to deposit fowls or the like into the chute 19 near the outlet of which is located a further endless conveyor belt 22 driven in any suitable manner at a predetermined speed.

In practice, young stock—say one day old chicks or just from an incubator—are placed on the upper stretch of the moving belt 6 and left thereon as long as required. During their stay upon the belt they may obtain all the food and drinking water which they require, from the respective troughs, the continuous flow of food to the moving food trough causing the food to be distributed throughout the length of the apparatus. Preferably the ducklings, chickens or similar stock are placed upon the belt in batches.

The rearing of the stock upon the continuously moving conveyor belt is quite independent of the speed of the belt, the movement being so slow as to be imperceptible to the stock but sufficient to carry away droppings and foreign matter which become dried upon the belt and are removed therefrom by the revolving wire brush 7, the dry droppings, available for use as manure, subsequently falling down chute 18 and being deposited upon the floor or ground, or into an appropriate receiving chamber. A suitable belt speed when rearing ducklings would be of the order of fifty feet per eight hours.

Whenever it should be decided that the stock upon the belt has been sufficiently reared, a clearer or sweeping board or panel 23 is positioned vertically on the belt by any conventional means, whereupon the board gradually moves along with the belt and ultimately congests the stock at the delivery end of the apparatus. Upon the framework 20, at this end of the apparatus, may be placed an auxiliary food trough 26, so that upon the congested stock arriving at this end, and after being starved a few hours, they endeavour to get food from the auxiliary trough and in so doing step upon the hinged or resilient flap doors 21 which open and deposit the fowls or the like into the chute 19, down which they fall on to the transverse conveyor belt 22 for packing or transportation. The time required for the development of livestock in apparatus as described varies according to the nature of the stock being treated.

With the process and apparatus described the actual saving of labour is very considerable, as any skilled attention, such as is usually required in the preliminary rearing of livestock, is rendered unnecessary, the operation being practically mechanical and the actual labour of feeding and watering occupying a minimum of time.

What we claim is:

1. Apparatus for the preliminary rearing of livestock comprising an elongated chamber, a belt-carrying member rotatably mounted at each end of said chamber, a flexible endless conveyor belt for the livestock mounted on said rotatable belt-carrying members and extending within the chamber from one end thereof to the other, driving means operatively connected to at least one of said rotatable belt-carrying members to continuously drive the conveyor belt longitudinally of the chamber, heating means mounted within the chamber adjacent the conveyor belt, a container for drinking water mounted within the chamber and extending longitudinally thereof adjacent the top of the conveyor belt and a flexible food trough integral with said conveyor belt and extending throughout the length thereof.

2. Apparatus for the preliminary rearing of livestock comprising an elongated chamber, a belt-carrying member rotatably mounted at each end of said chamber, a flexible endless conveyor belt for the livestock mounted on said rotatable belt-carrying members and extending within the chamber from one end thereof to the other, heating means mounted within the chamber adjacent the conveyor belt, a container for drinking water mounted within the chamber and extending longitudinally thereof adjacent the top of the conveyor belt, and a flexible food trough integral with said conveyor belt and extending throughout the length thereof, a food hopper mounted at one end of the chamber and located to feed food into said food trough, means on said hopper for controlling the flow of food therefrom, and driving means operatively connected to at least one of said rotatable belt-carrying members to rotate said member to continuously drive the conveyor belt longitudinally of the chamber in a direction to convey the food through the chamber.

3. Apparatus for the preliminary rearing of livestock comprising an elongated chamber having an outlet at one end thereof, a belt-carrying member rotatably mounted at each end of said chamber, a flexible endless conveyor belt for the livestock mounted on said rotatable belt-carrying members and extending within the chamber from one end thereof to the outlet at the other end, driving means operatively connected to at least one of said rotatable belt-carrying members to rotate said member to continuously drive the conveyor belt longitudinally of the chamber towards said outlet, heating means mounted within the chamber adjacent the conveyor belt, a flexible food trough integral with said conveyor belt and extending throughout the length thereof, a container for drinking water extending longitudinally within the chamber adjacent the top of the conveyor, at least one hinged flap door covering said outlet and normally resiliently held in the closed position but openable by the weight of livestock thereon to pass said livestock through said outlet, and a member detachably mounted transversely on the conveyor belt to urge the livestock towards the outlet end of the chamber.

4. Apparatus for the preliminary rearing of livestock comprising an elongated chamber having an outlet at one end thereof, a belt-carrying member rotatably mounted at each end of said chamber, a flexible endless conveyor belt for the livestock mounted on said rotatable belt-carrying members and extending within the chamber from one end thereof to the outlet at the other end, driving means operatively connected to at least one of said rotatable belt-carrying members to rotate said member to continuously drive the conveyor belt towards said outlet, at least one flap door hingedly mounted within the chamber to cover said outlet and normally resiliently held in the closed position but openable by the weight of livestock thereon to pass said livestock through said outlet, and a member detachably mounted transversely on the conveyor belt to urge the livestock towards the outlet end of the chamber.

5. Apparatus for the preliminary rearing of livestock comprising an elongated chamber having an outlet at one end thereof, a belt-carrying member rotatably mounted at each end of said chamber, a first flexible endless conveyor belt for the livestock mounted on said rotatable belt-carrying members and extending within the chamber from one end thereof to the outlet at the other end, driving means operatively connected to at least one of said rotatable belt-carrying members to rotate said member to continuously drive the conveyor belt towards said outlet, at least one flap door hingedly mounted within the chamber to cover said outlet and normally resiliently held in the closed position but openable by the weight of livestock thereon to pass said livestock through said outlet, and a member detachably mounted transversely on the conveyor belt to urge the livestock towards the outlet end of the chamber, a chute leading from said outlet, a second endless conveyor beneath said chute, and driving means operatively connected to said second mentioned endless conveyor to drive said conveyor.

6. Apparatus for the preliminary rearing of livestock comprising an elongated chamber having an outlet at both ends, a chute leading from each outlet, a belt-carrying member rotatably mounted within the chamber at each end thereof, a flexible endles conveyor belt for the livestock mounted on said belt-carrying member and extending within the chamber from one outlet to the other, means mounted within the chamber at one outlet and engaging the conveyor belt to clear droppings and foreign matter therefrom, at least one flap door hingedly mounted within the chamber to cover the outer outlet and normally resiliently held in the closed position but openable by the weight of livestock thereon to pass said livestock through said outlet, driving means operatively connected to at least one of said rotatable belt-carrying members to rotate said member to continuously drive the conveyor belt towards said flap door, and a member detachably mounted transversely on the conveyor belt to urge the livestock towards said flap door.

7. Apparatus as claimed in claim 6 wherein the means for clearing the conveyor belt of droppings and foreign matter consists of a rotatable brush engaging said conveyor, and driving means operatively connected to said brush to rotate the brush.

8. Apparatus for the preliminary rearing of livestock comprising an elongated chamber having an outlet at one end, a belt-carrying member rotatably mounted within the chamber at each end thereof, a flexible endless conveyor belt for the livestock mounted on said belt-carrying members, heating means mounted within the chamber adjacent the conveyor belt, a container for drinking water mounted within the chamber and extending longitudinally thereof adjacent the top of the conveyor, a flexible food trough integral with said conveyor and extending throughout the length thereof, a food hopper mounted at the end of the chamber remote from the outlet and located to feed food into said food trough, means on said hopper for controlling the flow of food therefrom, at least one flap door hingedly mounted within the chamber to cover said outlet and normally resiliently held in the closed position but openable by the weight of livestock thereon to pass said livestock through said outlet, a detachable member attached transversely to said conveyor belt, and driving means operatively connected to at least one of said belt-carrying members to rotate said member to continuously drive the conveyor belt in a direction to convey the food through the chamber and to move said detachable member towards the outlet end of the chamber.

9. Apparatus as claimed in claim 3, wherein the driving means for the conveyor belt comprises a motor, and variable speed reduction gearing operatively connecting the motor to said belt-carrying member.

HENRY LANCELOT FORBES.
ARTHUR NORMAN FORBES.

REFERENCES CITED

The following references are of record in the file of this patent:

UNITED STATES PATENTS

| Number | Name | Date |
|---|---|---|
| 1,186,444 | Schuchardt | June 6, 1916 |
| 1,793,626 | McCormick | Feb. 24, 1931 |
| 2,043,595 | Raymond | June 9, 1936 |
| 2,197,160 | Schuppner | Apr. 16, 1940 |
| 2,212,549 | Olson et al. | Aug. 27, 1940 |
| 2,292,020 | Venolia | Aug. 4, 1942 |
| 2,311,640 | Cornell | Feb. 23, 1943 |
| 2,314,344 | Cornell | Mar. 23, 1943 |
| 2,358,000 | Cornell | Sept. 12, 1944 |

FOREIGN PATENTS

| Number | Country | Date |
|---|---|---|
| 71,924 | Austria | June 10, 1916 |
| 72,015 | Austria | June 26, 1916 |